(12) United States Patent
Ahn et al.

(10) Patent No.: US 11,760,674 B2
(45) Date of Patent: Sep. 19, 2023

(54) SEMICONDUCTOR PROCESS WASTEWATER TREATMENT SYSTEM AND SEMICONDUCTOR PROCESS WASTEWATER TREATMENT METHOD USING THE SAME

(71) Applicants: SK hynix Inc., Gyeonggi-do (KR); Ewha University—Industry Collaboration Foundation, Seoul (KR)

(72) Inventors: Sehyuk Ahn, Gyeonggi-do (KR); Chanhyuk Park, Seoul (KR); Soyoun Kim, Seoul (KR); Minju Cha, Seoul (KR)

(73) Assignees: SK hynix Inc., Gyeonggi-do (KR); Ewha University—Industry Collaboration Foundation, Seoul (KR)

( * ) Notice: Subject to any disclaimer, the term of this patent is extended or adjusted under 35 U.S.C. 154(b) by 0 days.

(21) Appl. No.: 17/511,401

(22) Filed: Oct. 26, 2021

(65) Prior Publication Data
US 2022/0127177 A1  Apr. 28, 2022

(30) Foreign Application Priority Data
Oct. 26, 2020 (KR) .................. 10-2020-0139651

(51) Int. Cl.
*B01D 61/02* (2006.01)
*B01D 69/02* (2006.01)
(Continued)

(52) U.S. Cl.
CPC .............. *C02F 9/00* (2013.01); *B01D 61/027* (2013.01); *B01D 69/02* (2013.01); *B01D 71/021* (2013.01);
(Continued)

(58) Field of Classification Search
CPC .. B01D 61/027; B01D 71/021; B01D 71/024; C02F 3/28; C02F 2101/16
See application file for complete search history.

(56) References Cited

U.S. PATENT DOCUMENTS 3,964,998 A * 6/1976 Barnard ................ C02F 3/1257
 210/906
8,535,534 B2 9/2013 Stroot

FOREIGN PATENT DOCUMENTS

JP 2018143919 A * 9/2018
KR 10-0465524 B1 1/2005

OTHER PUBLICATIONS

Nakano T—JP-2018143919-A machine translation—Sep. 2018 (Year: 2018).*

(Continued)

*Primary Examiner* — Bradley R Spies
(74) *Attorney, Agent, or Firm* — IP & T GROUP LLP

(57) ABSTRACT

A semiconductor process wastewater treatment system and a semiconductor process wastewater treatment method using the same are disclosed. The disclosed semiconductor process wastewater treatment system may comprises: a processing unit configured to receive semiconductor process wastewater and treats the semiconductor process wastewater through a plurality of operations; and a membrane filtration tank arranged separately from the processing unit, the membrane filtration tank having a ceramic nano-membrane for filtering the semiconductor process wastewater which has passed through the processing unit, wherein the ceramic nano-membrane may include a carbon-based nano-material. The ceramic nano-membrane may include a graphene-based nano-material as the carbon-based nano-material.

9 Claims, 5 Drawing Sheets

(51) Int. Cl.

| | |
|---|---|
| *B01D 71/02* | (2006.01) |
| *C02F 1/44* | (2023.01) |
| *C02F 101/16* | (2006.01) |
| *C02F 103/34* | (2006.01) |
| *C02F 9/00* | (2023.01) |
| *C02F 101/14* | (2006.01) |
| *C02F 3/12* | (2023.01) |
| *C02F 3/28* | (2023.01) |

(52) U.S. Cl.
CPC .... *B01D 71/024* (2013.01); *B01D 2311/2688* (2013.01); *B01D 2325/02* (2013.01); *B01D 2325/14* (2013.01); *C02F 1/442* (2013.01); *C02F 3/1236* (2013.01); *C02F 3/28* (2013.01); *C02F 2101/14* (2013.01); *C02F 2101/16* (2013.01); *C02F 2103/346* (2013.01); *C02F 2301/046* (2013.01); *C02F 2301/08* (2013.01)

(56) References Cited

OTHER PUBLICATIONS

Li, Chen, et al. "Ceramic nanocomposite membranes and membrane fouling: A review." Water Research 175 (2020): 115674. (Year : 2020).*

Zhang, Mengchen, et al. "Effect of substrate on formation and nanofiltration performance of graphene oxide membranes." Journal of Membrane Science 574 (2019): 196-204. (Year: 2019).*

Korzenowski, Christa, et al. "Nanofiltration for the treatment of coke plant ammoniacal wastewaters." Separation and purification technology 76.3 (2011): 303-307. (Year: 2011).*

Wu, Ming, and Darren Delai Sun. "Characterization and reduction of membrane fouling during nanofiltration of semiconductor indium phosphide (InP) wastewater." Journal of membrane science 259.1-2 (2005): 135-144. (Year: 2005).*

Chung et al., Organic semiconductor wastewater treatment using a four-stage Bardenpho with membrane system, Environmental Technology, Nov. 2014, vol. 35, No. 22, pp. 2837-2845.

* cited by examiner

< Graphene oxide >

SEMICONDUCTOR PROCESS WASTEWATER TREATMENT SYSTEM AND SEMICONDUCTOR PROCESS WASTEWATER TREATMENT METHOD USING THE SAME

CROSS-REFERENCES TO RELATED APPLICATION

The present application claims the benefit of Korean patent application number 10-2020-0139651, filed on Oct. 26, 2020, which is herein incorporated by reference in its entirety.

BACKGROUND OF THE INVENTION

1. Field

The present invention relates to a wastewater treatment system and a wastewater treatment method and, more particularly, to a semiconductor process wastewater treatment system and a semiconductor process wastewater treatment method using the same.

2. Description of the Related Art

During a semiconductor manufacturing process, a considerable amount of wastewater may be generated for each unit process. Since semiconductor process wastewater contains high concentrations of toxic substances such as nitrogen, phosphorus, and fluorine, an efficient method for removing them is needed. Recently, interest in semiconductor process wastewater treatment is increasing, and many studies related to this have been conducted. Conventional chemical treatment methods such as calcium salt precipitation and struvite precipitation have been implemented. However, chemical treatment methods have a problem such as low economic efficiency due to the high cost for the required chemicals.

As a semiconductor process wastewater treatment technology which replaces or is used together with the chemical treatment method, there is a biological treatment method such as a biological nutrient removal (BNR) process. The biological treatment method has a disadvantage that it is not suitable for the treatment of ammonia nitrogen in the wastewater due to the low content of organic matter which is characteristic of the wastewater of the semiconductor process. As another example, a reverse osmosis (RO) process corresponding to a physical treatment method is a process capable of removing the ammonia nitrogen and hydrofluoric acid components, but has a problem that the operation cost is very high.

Accordingly, there is a need for a semiconductor process wastewater treatment system and a treatment method capable of economically and effectively removing ionic substances in semiconductor wastewater without the requirement to inject a chemical product or source material.

SUMMARY OF THE INVENTION

Technological objects achieved by the present invention include providing a semiconductor process wastewater treatment system which is economical, and can effectively and efficiently remove ionic substances from semiconductor wastewater, without separate chemical injection and without requiring high operating costs.

A technological object to be achieved by the present invention includes providing a semiconductor process wastewater treatment system capable of effectively and efficiently removing nitrogen components and fluorine components from semiconductor wastewater.

A technological object to be achieved by the present invention is to provide a semiconductor process wastewater treatment method using an improved semiconductor process wastewater treatment system including a membrane separation tank for the effective and economic removal of ionic substances.

The problems to be solved by the present invention are not limited to the problems mentioned above. These and other problems which are not mentioned will be understood by those skilled in the art of the present invention from the following description.

According to an embodiment of the present invention, there is provided a semiconductor process wastewater treatment system comprising: a processing unit configured to receive semiconductor process wastewater and treat it through a plurality of operations; and a membrane filtration tank arranged separately from the processing unit having a ceramic nano-membrane for filtering the semiconductor process wastewater which has passed through the processing unit, wherein the ceramic nano-membrane includes a carbon-based nano-material. The processing unit refers to a plurality of equipment and operations typically employed in an existing semiconductor process wastewater treatment process known widely within the art as the Bardenpho process. An example of a configuration of the Bardenpho process unit is described in FIG. 2 but it should be understood that the skilled person in this art would know of variations of the Bardenpho process. The present invention may employ the Bardenpho process unit as described, for example, in FIG. 2.

The ceramic nano-membrane may include a graphene-based nano-material as the carbon-based nano-material.

The ceramic nano-membrane may include graphene oxide as the carbon-based nano-material.

The ceramic nano-membrane may include a membrane body formed of an inorganic material; and a coating layer formed on a surface of the membrane body and including the carbon-based nano-material.

The content of the carbon-based nano-material in the ceramic nano-membrane may be about 1 wt % to 2 wt % of the total weight of the ceramic nano-membrane.

The ceramic nano-membrane may be a nanofiltration class membrane having an average pore size of about 0.01 μm or less.

The ceramic nano-membrane may contain negative charges on its surface.

The ceramic nano-membrane may be configured to filter nitrogen and nitrogen-containing components.

The ceramic nano-membrane may be configured to filter fluorine and fluorine-containing components.

The processing unit includes a first anoxic tank, a first oxic tank, a second anoxic tank, and a second oxic tank which are sequentially arranged from the inlet to which the semiconductor process wastewater is introduced.

The semiconductor process wastewater treatment system may further include a clarifier disposed between the processing unit and the membrane filtration tank.

It may be configured to return at least part of an activated sludge precipitated by the clarifier to the front end of the processing unit.

The semiconductor process wastewater which has passed through the clarifier may be configured to be discharged after passing through the membrane filtration tank.

According to other embodiment of the present invention, there is provided a method for treating a semiconductor process wastewater comprising: processing a semiconductor process wastewater through a processing unit including a plurality of operations; and feeding an effluent from the processing unit to a membrane filtration unit arranged separately from the processing unit, the membrane filtration unit having a ceramic nano-membrane, and filtering the effluent to remove nitrogen, fluorine, nitrogen-containing components, and fluorine-containing components from the effluent. The ceramic nano-membrane may comprise: a porous membrane main body including a metal oxide forming a network structure forming a plurality of pores; and a coating layer which is coated on at least one of a surface or inside of the membrane body and includes a carbon-based nano-material including graphene oxide.

According to another embodiment of the present invention, there is provided a nano-membrane filter comprising: a porous membrane main body including a metal oxide forming a network structure forming a plurality of pores; and a coating layer which is coated at least on a surface or inside of the membrane main body and includes a carbon-based nano-material.

The carbon-based nano-material may include graphene oxide.

According to another embodiment of the present invention, there is provided a semiconductor process wastewater treatment method for treating semiconductor process wastewater using the above-described semiconductor process wastewater treatment system.

According to the embodiments of the present invention, it is possible to implement a semiconductor process wastewater treatment system and treatment method capable of economically and effectively and/or efficiently removing ionic substances in semiconductor wastewater while being economical because injection of separate chemical product or high operating cost is not required. In addition, according to embodiments of the present invention, it is possible to implement a semiconductor process wastewater treatment system and a treatment method capable of easily and/or efficiently removing nitrogen components and fluorine components in semiconductor wastewater.

DETAILED DESCRIPTION OF THE INVENTION

Figure 1:
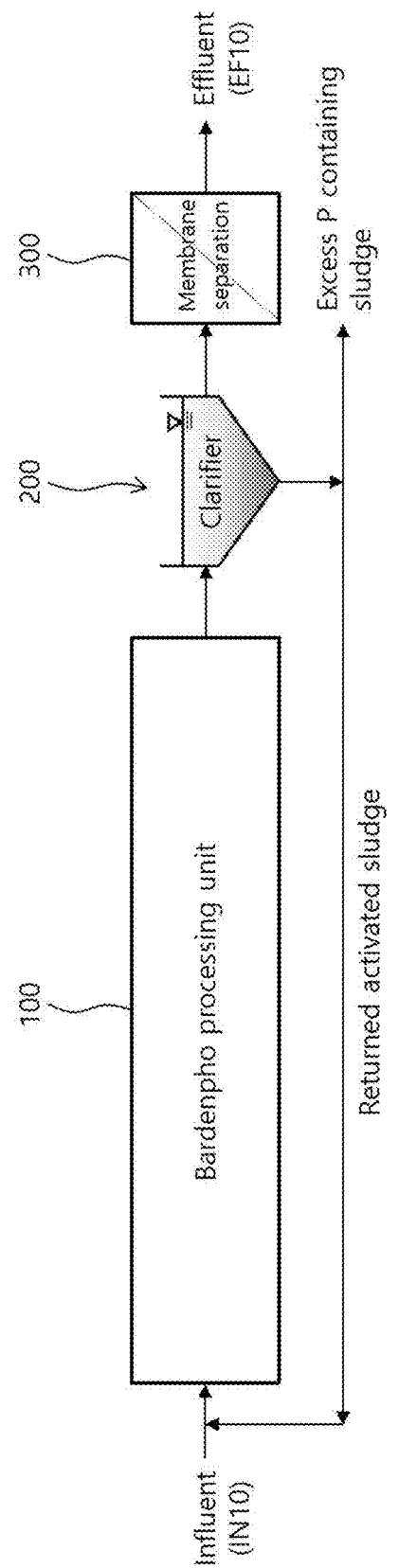
FIG. 1 is a diagram schematically showing a semiconductor process wastewater treatment system according to an embodiment of the present invention.

Hereinafter, various embodiments of the present invention will be described in detail with reference to the accompanying drawings.

The embodiments of the present invention to be described below are provided to more clearly describe the present invention to those having common knowledge in the related art, and the scope of the present invention is not limited to the following examples. The following embodiments may be modified in many different forms.

The terminology used herein is used to describe a specific embodiment and is not intended to limit the present invention. As used herein, a singular form may include plural forms unless the context clearly indicates otherwise. Also, as used herein, the term such as comprise" and/or "comprising" specifies the mentioned shapes, numbers, steps, actions, members, elements and/or the presence of these groups, and does not exclude the presence or addition of one or more other shapes, numbers, actions, members, elements and/or presence or addition of groups. In addition, the term, "connection" used in the present specification means not only a configuration wherein certain members are directly connected, but also includes a configuration wherein the members are indirectly connected by interposing other members between members.

In addition, in this specification, when a member is positioned "on" another member, this includes not only the case where the member is in contact with the other member, but also the case where another member exists between the two members. The term, "and/or" as used herein includes any one and all combinations of one or more of the corresponding listed items. In addition, terms such as "about", "substantially" and the like used in the present specification are used in a range of numerical values or degrees, or is used as a meaning close thereto, in consideration of inherent manufacturing and material tolerances, and in order to aid understanding of the present application, the exact or absolute figures provided for this purpose are used to prevent an infringer from misusing the stated disclosure.

Hereinafter, embodiments of the present invention will be described in detail with reference to the accompanying drawings. The size or thickness of the areas or parts shown in the accompanying drawings may be exaggerated somewhat for clarity of the specification and convenience of description. The same reference numerals denote the same elements throughout the detailed description.

FIG. 1 is a diagram schematically showing a semiconductor process wastewater treatment system according to an embodiment of the present invention.

Referring to FIG. 1, the semiconductor process wastewater treatment system according to the present embodiment may include a Bardenpho processing unit 100 which treats injected semiconductor process wastewater through a plurality of operations, and a membrane filtration tank 300 having a ceramic nano-membrane for filtering the semiconductor process wastewater that has passed through the Bardenpho process unit 100. The membrane filtration tank may also be referred to herein as membrane separation tank

300. The ceramic nano-membrane may include a carbon-based nano-material. The ceramic nano-membrane may include a graphene-based nano-material as the carbon-based nano-material. As a specific example, the ceramic nano-membrane may include graphene oxide as the carbon-based nano-material. The ceramic nano-membrane will be described in more detail later with reference to FIGS. 3 to 5.

A clarifier (also referred to as a settling tank) 200 may be further provided between the Bardenpho process unit 100 and the membrane filtration tank 300. After the semiconductor process wastewater that has passed through the Bardenpho process unit 100 undergoes a precipitation process in the clarifier 200, the wastewater in a solution state that has not been precipitated may be introduced into the membrane filtration tank 300 and filtered by the membrane filtration tank 300. At least a part of activated sludge precipitated by the clarifier 200 may be returned to a front end of the Bardenpho process unit 100. Although not shown herein, a pipe and a pump member for returning the at least a portion of the precipitated activated sludge may be further provided between the clarifier 200 and the front end of the Bardenpho process unit 100. In addition, at least a portion of a solid sludge (waste sludge) precipitated by the clarifier 200 may be removed or discharged without being returned.

The precipitated solid sludge that is not recycled back to the Bardenpho processing unit (waste sludge) is referred to herein as an excess P containing sludge. The semiconductor process wastewater that has passed through the clarifier 200 may be filtered through the membrane filtration tank 300 and then discharged as effluent. In FIG. 1, reference numeral IN10 denotes an inlet portion (injection portion), and reference numeral EF10 denotes a discharge portion.

Figure 2:
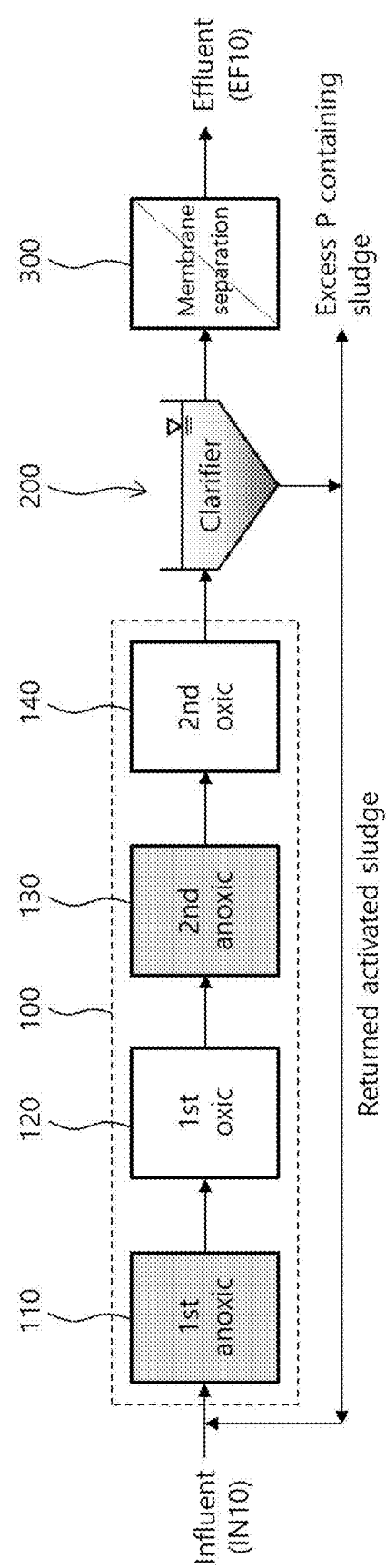
FIG. 2 is a diagram illustrating a semiconductor process wastewater treatment system in which an example configuration of the Bardenpho process unit 100 in FIG. 1 is embodied according to an embodiment of the present invention.

FIG. 2 is a diagram illustrating a semiconductor process wastewater treatment system in which a configuration of the Bardenpho process unit 100 in FIG. 1 is shown according to an embodiment of the present invention.

Referring to FIG. 2, the Bardenpho process unit 100 may include a first anoxic tank 110, a first oxic tank 120, a second anoxic tank 130 and a second oxic tank 140 sequentially arranged in the recited order from the inlet portion IN10. The first anoxic tank 110, the first oxic tank 120, the second anoxic tank 130 and the second oxic tank 140 may be arranged in series between the inlet IN10 and the clarifier 200. In this case, the second oxic tank 140 may be disposed between the second anoxic tank 130 and the clarifier 200. In addition, the clarifier 200 may be disposed between the second oxic tank 140 and the membrane filtration tank 300. At least a portion of the activated sludge precipitated by the clarifier 200 may be returned to the front end of the first anoxic tank 110.

Although not shown, an 'internal return pipe' may be further provided between the wastewater discharge unit (rear end) of the first oxic tank 120 and the wastewater input unit (front end) of the first anoxic tank 110. In this case, a portion of the wastewater that has passed through the first oxic tank 120 may be returned to the first anoxic tank 110 and may be introduced into the first anoxic tank 110 once again. In addition, a separate anaerobic tank may be further provided between the inlet portion IN10 and the first anoxic tank 110.

The first oxic tank 120 may oxidize a nitrogen component contained in the semiconductor process wastewater into a nitric acid component ($NO_3^-$). The second anoxic tank 130 may reduce the nitric acid component introduced from the first oxic tank 120 and may denitrify the nitric acid component. The second oxic tank 140 may serve to remove nitrogen gas in the wastewater and oxidize residual nitrogen components into ammonium components ($NH_4^+$). However, it should be understood that as described herein, the roles of each of the first anoxic tank 110, the first oxic tank 120, the second anoxic tank 130 and the second oxic tank 140 are provided as examples, and that these tanks may have also other functions and/or roles which are well known to the those skilled in this art.

The clarifier 200, as described above, may be a device for precipitating sludge from the wastewater, removing a waste sludge and returning an activated sludge to a front end of the Bardenpho process unit 100. In some cases, the clarifier 200 may be regarded as part of the Bardenpho process unit 100.

The membrane filtration tank 300 may filter and remove nitrogen components (nitrogen and nitrogen-containing components) and fluorine components (fluorine and fluorine-containing components) from the wastewater using the aforementioned ceramic nano-membrane. In an example, the membrane filtration tank 300 may filter and remove residual ionic components such as ammonium which is not reduced in wastewater by using the ceramic nano-membrane. The ceramic nano-membrane may include graphene oxide as a carbon-based nano-material, and in this regard, it may have excellent filtration performance for nitrogen and fluorine components.

The ceramic nano-membrane containing graphene oxide may effectively remove ammonia nitrogen and fluorine (fluoric acid) components, which are representative components in the wastewater from a semiconductor process. The ceramic nano-membrane with the graphene oxide formed on the surface of the ceramic nano-membrane has a very small pore size, and, thus, a strong negative charge may be formed on the surface of the ceramic nano-membrane, thereby exhibiting high selectivity for an ionic material. Accordingly, it is possible to efficiently remove monovalent ionic components, such as ammonium ions and fluorine ions, which have been difficult to treat by employing conventional membrane processes.

In the described embodiment of the present invention, the membrane filtration tank 300 including the ceramic nano-membrane may be disposed separately from the Bardenpho process unit 100 as a subsequent operation of the Bardenpho process unit 100. In the embodiment of FIGS. 1 and 2, the clarifier 200 is arranged between the Bardenpho process unit 100 and the membrane filtration tank 300. Accordingly, the membrane filtration tank 300 may be disposed between the clarifier 200 and the discharge unit EF10. According to this configuration the effectiveness and efficiency of the filtration process using the membrane filtration tank 300 is enhanced. Since the solid sludge is removed and returned by the clarifier 200, and the filtration process can be performed for the remaining liquid wastewater, the burden of the filtration process may be greatly reduced and the filtration performance may be improved. Therefore, as compared to a case where the membrane filtration tank 300 is disposed in the Bardenpho process unit 100 or the clarifier 200, the semiconductor process wastewater treatment system according to the embodiment described with reference to FIGS. 1 and 2 may have excellent filtration performance and high efficiency.

Figure 3:
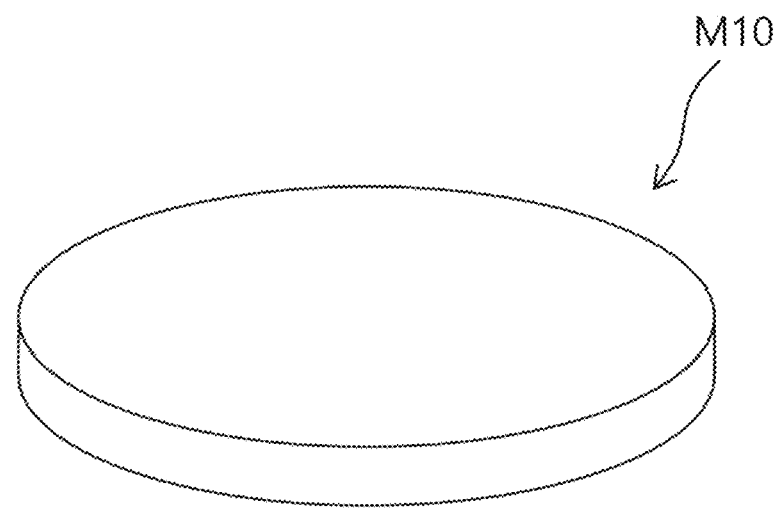
FIG. 3 is a perspective view schematically showing a ceramic nano-membrane M10 that may be applied to a membrane filtration tank of a semiconductor process wastewater treatment system according to an embodiment of the present invention.

FIG. 3 is a perspective view schematically showing a ceramic nano-membrane M10 that may be applied to a membrane filtration tank of a semiconductor process wastewater treatment system according to an embodiment of the present invention.

Referring to FIG. 3, the ceramic nano-membrane M10 may have a form of a film, and may have various shapes such as a circle or a polygon (e.g., a square). The thickness of the ceramic nano-membrane M10 may be about several millimeters, and the diameter of the ceramic nano-membrane M10 may be several tens of millimeters or more. For example, the thickness of the ceramic nano-membrane M10 may be about 1 mm to 5 mm, and the diameter may be about 20 mm to 200 mm or 200 mm or more.

The ceramic nano-membrane M10 may be mounted on a predetermined membrane holder (not shown) and used in the predetermined membrane holder. As semiconductor process wastewater permeates from one surface (e.g., an upper surface) to the other surface (e.g., a lower surface) of the ceramic nano-membrane M10, nitrogen components and fluorine components in the wastewater may be filtered and removed.

A ceramic nano-membrane M10 may contain carbon-based nano-material. The ceramic nano-membrane M10 may contain graphene-based nano-material as a carbon-based nano-material. As a specific example, the ceramic nano-membrane M10 may contain graphene oxide as a carbon-based nano-material. The ceramic nano-membrane M10 may include a membrane body formed of an inorganic material, and a coating layer including the carbon-based nano-material as formed on a surface of the membrane body. In one embodiment, the carbon-based nano-material may be graphene oxide.

The content of the carbon-based nano-material in the ceramic nano-membrane M10 may be about 1 wt % to 2 wt %. When the content condition of the carbon-based nano-material is satisfied, it may be more advantageous for the ceramic nano-membrane M10 to have excellent filtration performance. The ceramic nano-membrane M10 may have nanofiltration-class membrane characteristics by the carbon-based nano-material. For example, the ceramic nano-membrane M10 may have an average pore size of about 0.01 μm or less. The average pore size of the ceramic nano-membrane M10 may be approximately 0.001 μm to 0.01 μm.

The ceramic nano-membrane M10 may have a strong negative charge on its surface, and thus, may have high selectivity (i.e., filtration characteristics) for an ionic material. The ceramic nano-membrane M10 may serve to filter nitrogen components (nitrogen and nitrogen-containing components) and fluorine components (fluorine and fluorine-containing components) in the semiconductor process wastewater.

Figure 4:
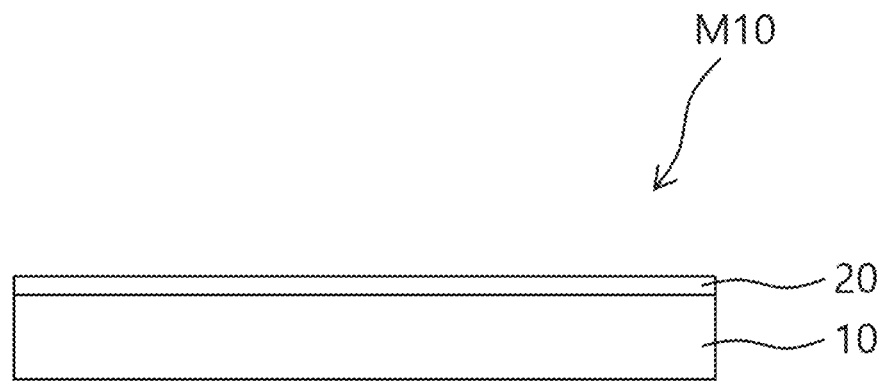
FIG. 4 is a cross-sectional view of the ceramic nano-membrane M10 of FIG. 3 according to an embodiment of the present invention.

FIG. 4 is a cross-sectional diagram illustrating the configuration of the ceramic nano-membrane M10 which may be applied to a membrane filtration tank of a semiconductor process wastewater treatment system according to an embodiment of the present invention.

Referring to FIG. 4, the ceramic nano-membrane M10 may have a membrane body 10 formed of an inorganic material, and a coating layer 20 formed on a surface of the membrane body 10 and including the carbon-based nano-material. The coating layer 20 may be the carbon-based nano-material.

The inorganic material constituting the membrane body 10 may include, for example, a metal oxide. The inorganic material constituting the membrane body 10 may be non-reactive to the chemicals or the solvents contained in the semiconductor process wastewater. The inorganic material constituting the membrane body 10 may allow a wide range of pH tolerance. As a specific example, the membrane body 10 may be formed of a metal oxide (inorganic material) such as titanium oxide ($TiO_2$). However, the material of the membrane body 10 is not limited to titanium oxide, and may include, for example, aluminum oxide or magnesium oxide.

The membrane body 10 may include a plurality of pores (not shown) while the metal oxide forms a network structure. The plurality of pores are open pores forming fine channels allowing a fluid to flow from a front surface to a rear surface of the membrane body part 10. In an embodiment, the membrane body 10 dissolves a metal organic precursor such as methoxide, acetate, sulfate, nitrate, hydroxide and hydride of a metal in a solvent, and then a porous structure having nano pores may be formed through a gelation process and a drying process. Various known techniques may be referred to for this manufacturing technique, and the present invention is not limited thereto.

The carbon-based nano-material included in the coating layer 20 may be, for example, graphene oxide. The coating layer 20 may include a plurality of graphene oxide particles (or flakes). After preparing a solution in which graphene oxide is dissolved (that is, a graphene oxide solution), the solution may be filtered so that the solution may pass through the membrane body part 10 using a vacuum process, resulting in that a coating layer 20 including the graphene oxide may be formed on the surface of the membrane body 10. In this case, the coating layer may be formed on surfaces of fine channels inside the membrane body 10.

The graphene oxide of the coating layer formed on the surface and the inside of the membrane body 10 may reduce the pore size of the membrane body 10. Accordingly, the ceramic nano-membrane M10 may have a fine pore size (an average pore size) of a nanofiltration grade. In addition, the ceramic nano-membrane M10 may have a unique filtration performance due to the material properties of the graphene oxide itself.

In FIG. 4, the coating layer 20 is illustrated in the form of a continuous layer having a uniform thickness, but the coating shape of the coating layer 20 may vary. For example, the coating layer 20 may have a non-continuous layer structure (i.e., a discontinuous layer structure), or may have a non-uniform thickness.

Figure 5:
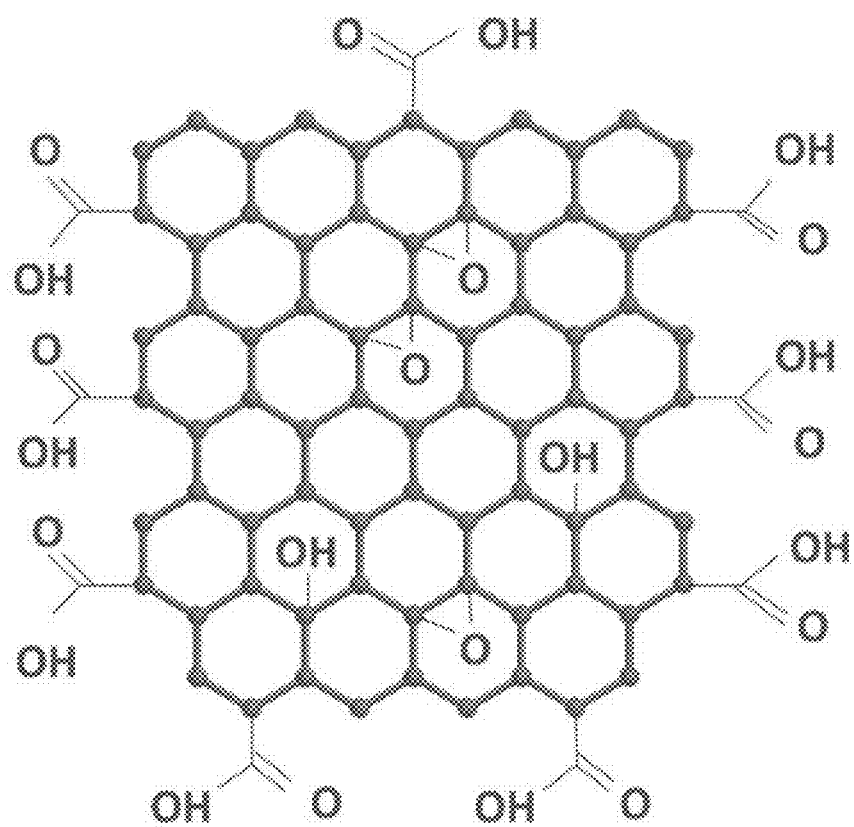
FIG. 5 is a diagram showing a molecular structure of graphene oxide applied to a ceramic nano-membrane of a semiconductor process wastewater treatment system according to an embodiment of the present invention.

FIG. 5 is a diagram showing a molecular structure of graphene oxide that may be applied to a ceramic nano-membrane of a semiconductor process wastewater treatment system according to an embodiment of the present invention.

Referring to FIG. 5, the graphene oxide may have a structure in which oxic group and hydroxyl groups are bonded to the surface and edge of graphene. A hydroxyl group and an epoxy group may be bonded to the surface of the graphene oxide, and a carboxyl group may be bonded to the edge. However, the molecular structure of the graphene oxide shown in FIG. 5 is exemplary and may be variously altered. Depending on the oxygen concentration of the graphene oxide or the concentration of the bonding groups, the characteristics of the ceramic nano-membrane to which the oxide is applied may be adjusted.

The semiconductor process wastewater treatment technology according to an embodiment of the present invention described with reference to FIGS. 1 to 5 may be referred to as an improved BNR (biological nutrient removal) technology using a Bardenpho process and a membrane filtration process.

In the case of a biological treatment method such as a conventional BNR (biological nutrient removal) process, there is a problem that it is not suitable for treatment of ammonia nitrogen in the wastewater due to the low content of organic matter, which is originated from a characteristic of semiconductor wastewater. In addition, in the existing BNR process, there is a disadvantage in that a carbon source is injected from the outside for activation of microorganisms to adjust the carbon:nitrogen ratio (i.e., C:N ratio) in the system. However, in the present invention, as the membrane filtration process to which the ceramic nano-membrane is applied is utilized, nitrogen components and fluorine components in semiconductor wastewater may be effectively and efficiently removed without separately injecting a carbon source (carbon source) from the outside. In particular, by applying the graphene oxide to the ceramic nano-membrane, it is possible to implement a nanofiltration class membrane capable of effectively filtering the nitrogen components and the fluorine components in the semiconductor wastewater. In addition, according to an embodiment of the present invention, excellent removal efficiency for ionic components that were previously difficult to remove may be achieved due to a synergy effect of the excellent properties such as high water permeability and high strength of the ceramic material and the excellent filtration properties of the nano-membrane.

Figure 6:
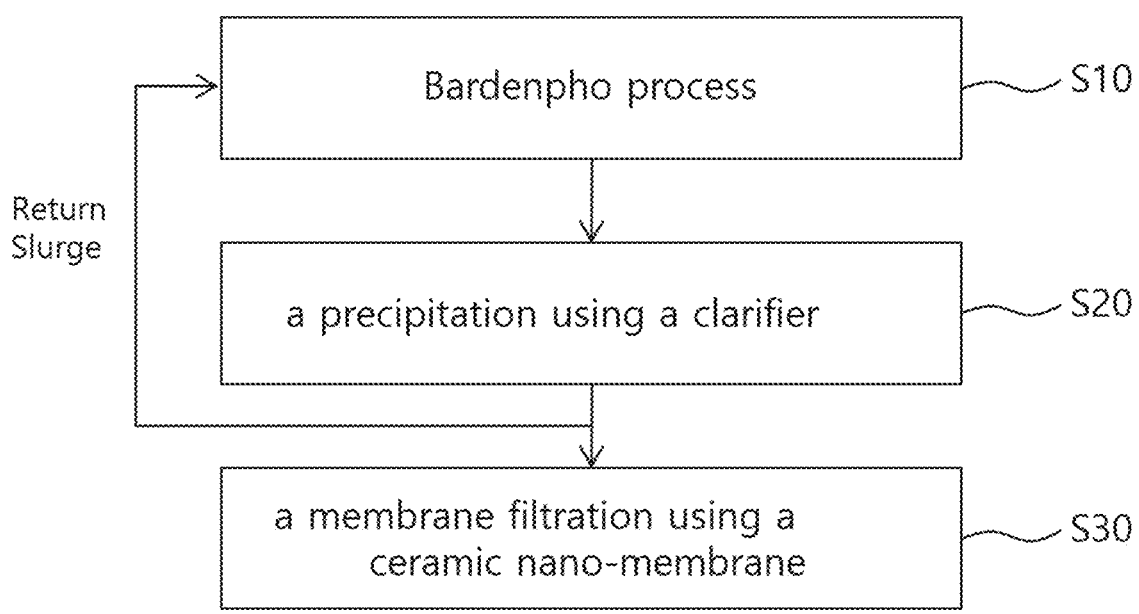
FIG. 6 is a flowchart of a semiconductor process wastewater treatment method using the semiconductor process wastewater treatment system according to an embodiment of the present invention.

FIG. 6 is a flowchart illustrating a semiconductor process wastewater treatment method using the semiconductor process wastewater treatment system according to an embodiment of the present invention.

Referring to FIG. 6, the semiconductor process wastewater treatment method according to the present embodiment includes a Bardenpho process S10, a precipitation operation using the clarifier S20, and a membrane filtration operation S30 using a ceramic nano-membrane. The semiconductor process wastewater treatment method may be performed by using the semiconductor process wastewater treatment system described with reference to FIGS. 1 to 5. The Bardenpho process S10 may be performed by using the Bardenpho process unit 100 of FIGS. 1 and 2, and the precipitation operation S20 may be performed using the clarifier 200 of FIGS. 1 and 2. The membrane filtration operation S30 may be performed by using the membrane filtration unit 300 including the ceramic nano-membrane M10 described with reference to FIGS. 1 to 5. The specific matters related to the semiconductor process wastewater treatment method according to the present embodiment may be the same as those described with reference to FIGS. 1 to 5, and thus repeated descriptions thereof will be omitted. In some cases, it may be possible to exclude the precipitation operation S20 in FIG. 6.

According to the above-described embodiments of the present invention, there is no need to inject a separate chemical product or source (ex, carbon source) material and high operating cost is not required. Thus, it is possible to implement a semiconductor process wastewater treatment system and treatment method capable of effectively and efficiently removing ionic substances in semiconductor wastewater while being economical. In addition, according to embodiments of the present invention, it is possible to implement a semiconductor process wastewater treatment system and a treatment method capable of easily/efficiently removing nitrogen components and fluorine components in semiconductor wastewater.

In the present specification, an embodiment of the present invention has been disclosed, and although specific terminologies are used, these are merely used in terms of a general meaning to easily explain the technological contents of the present invention and to aid understanding of the present invention, and it is not intended to limit the scope of the present invention. In addition to the embodiments disclosed herein, it is apparent to those of ordinary skill in the art that other modifications based on the technological concepts of the present invention may be implemented. Those having ordinary knowledge in the related art can understand that in connection with the semiconductor process wastewater treatment system and the semiconductor process wastewater treatment method according to the embodiment described with reference to FIGS. 1 to 6, various substitutions, changes and modifications may be within the scope of the technological spirits of the present invention. As a specific example, in the above description, a case where a carbon source is not separately injected into the system from the outside has been mainly described, but if necessary, a relatively small amount of carbon source may be separately injected into the system. In this case, the injection of the carbon source may be applied to the front end or the rear end of the Bardenpho process unit 100 of FIG. 2. In addition, the configuration of the Bardenpho process unit 100 may be variously altered within the scope of the present invention. In addition, in the above description, semiconductor process wastewater may be a concept encompassing not only wastewater from the manufacturing process of devices such as semiconductor memories, but also wastewater discharged from manufacturing processes of various other devices to which semiconductors are applied, for example, display devices and other electronic devices. Therefore, the scope of the invention should not be determined by the described embodiments, but should be determined by the technological idea described in the claims.

[Explanation of Symbols]

| | |
|---|---|
| 10: A membrane body | 20: A coating layer |
| 100: Bardenpho process unit | 110: A first anoxic tank |
| 120: A first oxic tank | 130: A second anoxic tank |
| 140: A second oxic tank | 200: a clarifier |
| 300: A membrane filtration tank | IN10: inlet |
| EF10: A discharge unit | M10: A ceramic nano-membrane |

What is claimed is:

1. A semiconductor process wastewater treatment system comprising:

a processing unit configured to receive semiconductor process wastewater and treat the semiconductor process wastewater through a plurality of operations, wherein the processing unit includes a Bardenpho processing unit, the processing unit includes a first anoxic tank, a first oxic tank, a second anoxic tank, and a second oxic tank which are sequentially arranged from an inlet portion to which the semiconductor process wastewater is introduced, and the second oxic tank is configured to remove nitrogen gas in the semiconductor process wastewater and oxidize residual nitrogen components into ammonium components ($NH_4^+$);

a membrane filtration tank arranged separately from the processing unit, the membrane filtration tank having a ceramic nano-membrane for filtering the semiconductor process wastewater which has passed through the processing unit, wherein the ceramic nano-membrane includes a carbon-based nano-material, the ceramic nano-membrane includes graphene oxide as the carbon-based nano-material, and a content of the carbon-based nano-material in the ceramic nano-membrane is 1 wt % to 2 wt % of the total weight of the ceramic nano-membrane; and a clarifier disposed between the processing unit and the membrane filtration tank, wherein the clarifier is disposed between the second oxic tank and the membrane filtration tank, wherein the semiconductor process wastewater treatment system is configured to remove nitrogen components and fluorine components in the semiconductor process wastewater without injecting a carbon source from outside.

2. The semiconductor process wastewater treatment system of the claim 1, wherein the ceramic nano-membrane includes a membrane body formed of an inorganic material; and a coating layer, the coating layer being formed on a surface of the membrane body and including the carbon-based nano-material.

3. The semiconductor process wastewater treatment system of the claim 1, wherein the ceramic nano-membrane is a nanofiltration class membrane having an average pore size of about 0.01 μm or less.

4. The semiconductor process wastewater treatment system of the claim 1, wherein the ceramic nano-membrane contains negative charges on a surface of the ceramic nano-membrane.

5. The semiconductor process wastewater treatment system of the claim 1, wherein the ceramic nano-membrane is configured to filter nitrogen and nitrogen-containing components.

6. The semiconductor process wastewater treatment system of the claim 1, wherein the ceramic nano-membrane is configured to filter fluorine and fluorine-containing components.

7. The semiconductor process wastewater treatment system of the claim 1, wherein at least part of an activated sludge precipitated by the clarifier is returned to the front end of the processing unit.

8. The semiconductor process wastewater treatment system of the claim 1, wherein the semiconductor process wastewater which has passed through the clarifier is discharged after passing through the membrane filtration tank.

9. A semiconductor process wastewater treatment method for treating semiconductor process wastewater by using the semiconductor process wastewater treatment system according to claim 1.

* * * * *